United States Patent
Pinheiro et al.

(10) Patent No.: US 7,934,131 B1
(45) Date of Patent: Apr. 26, 2011

(54) SERVER FARM DIAGNOSTIC AND STATUS SYSTEM

(75) Inventors: Eduardo Pinheiro, Sunnyvale, CA (US); Luiz Andre Barroso, Los Altos, CA (US); Andrew Tibbits, San Francisco, CA (US); Wolf-Dietrich Weber, San Jose, CA (US)

(73) Assignee: Google Inc., Mountain View, CA (US)

( * ) Notice: Subject to any disclaimer, the term of this patent is extended or adjusted under 35 U.S.C. 154(b) by 237 days.

(21) Appl. No.: 12/391,498

(22) Filed: Feb. 24, 2009

(51) Int. Cl.
*G06F 11/00* (2006.01)

(52) U.S. Cl. .......................................... 714/43; 709/224

(58) Field of Classification Search .................... 714/43; 709/224
See application file for complete search history.

(56) References Cited

OTHER PUBLICATIONS http://www.nagios.org/, pp. 1-2, downloaded Jan. 19, 2009, "Enterprise-Class Open Source Monitoring".
http://www.nagios.org/about/, pp. 1-3, downloaded Jan. 19, 2009, "Get proactive. Save time, money, and your sanity.".

*Primary Examiner* — Bryce P Bonzo
(74) *Attorney, Agent, or Firm* — Park, Vaughan, Fleming & Dowler LLP

(57) ABSTRACT

Methods, systems and computer-program products are disclosed that provide a scalable system for evaluating the health of and providing status about any of a multitude of monitored computers.

18 Claims, 4 Drawing Sheets

SERVER FARM DIAGNOSTIC AND STATUS SYSTEM

BACKGROUND

1. Technical Field

This disclosure is generally related to server clusters. More specifically, this disclosure is related to determining the health of a particular component of a server farm comprising a multitude of servers.

2. Related Art

A server farm is a collection of computer servers configured to provide reliable computing service. An organization can use a server farm to provide networked search services, computing resources, etc. Generally, the server farm comprises a set of monitored computers organized into clusters controlled by a cluster scheduler. Each of the monitored computers provides operational state signals that indicate the state of its components. Thus, if a cooling fan fails, a temperature at a given sensor exceeds a limit, a disk drive fails, etc. for a monitored computer, the cluster scheduler can ignore the monitored computer until it is repaired. For small server farms, the cluster scheduler can request the state from the monitored computers it is scheduling. However, this approach does not scale. In addition, this approach does not use historical data about the monitored computer. Many processes other than the cluster scheduler often need to know about the health of a monitored computer in the server farm (one example of such a process can be a file system that strives to make sure that file data exists in three different monitored computers in the server farm; if one of these monitored computers should fail, its portion of the file data is replicated to another monitored computer to maintain the file data redundancy).

It is known in the art how to obtain operational state signals for a monitored computer. For example, a monitored computer can periodically send its operational state signals to a monitoring system, a monitoring system can poll each monitored computer for its operational state signals, etc. Some monitoring systems gather signals from the monitored computers and trigger rules based on those signals. However, operational state signals for a single monitored computer only provide a snapshot into the current state of the monitored computer. While snapshots of operational state signals can indicate that the monitored computer has had an error, it is difficult to determine whether such an error is transitory, or is a predictor of a component failure. In addition, these systems need to provide timely indicators of the status of the monitored computers to processes in the server farm (for example, the cluster schedulers and/or file system) and are thereby limited by how much data can be retained and the number and complexity of rules that can be applied to the data without becoming untimely. One example of the known art is the open-source Nagios® program.

Many server farms do not have enough monitored computers to provide statistically significant amounts of data to reliably predict component failures. While very large server farms (containing tens of thousands (or more) of servers) can provide statistically significant amounts of data, the prior approaches for obtaining and analyzing historical operational state signals (and repair history) do not scale well, and it is difficult to efficiently detect when a monitored computer has failed or is ready to fail. In addition, ad-hoc approaches to determining the wellness state of a server lead to a proliferation of performance data formats and a diversity of programs used to determine the status of a particular monitored computer.

The existing monitoring systems show operational or non-operational status, but do not provide information regarding the likelihood of imminent failure. Measurements of temperatures, fan speeds, internal device status (such as SMART status for disk drives, as well as disk read retries) can be useful in determining the present state of the computer. However, the present states of these measurements often do not indicate the imminence of failure. For example, one model of disk drive can have intermittent access failures with successful retries without these failures being a predictor of imminent disk drive failure, while similar failures in another model of disk drive can be a powerful predictor of imminent drive failure; one disk drive model may be, for example, more sensitive to ambient temperature conditions than another disk drive model.

It is difficult to efficiently, quickly and reliably locate failed and/or ready-to-fail computers in a server farm that includes tens of thousands (or more) of monitored computers.

DETAILED DESCRIPTION

Figure 1:
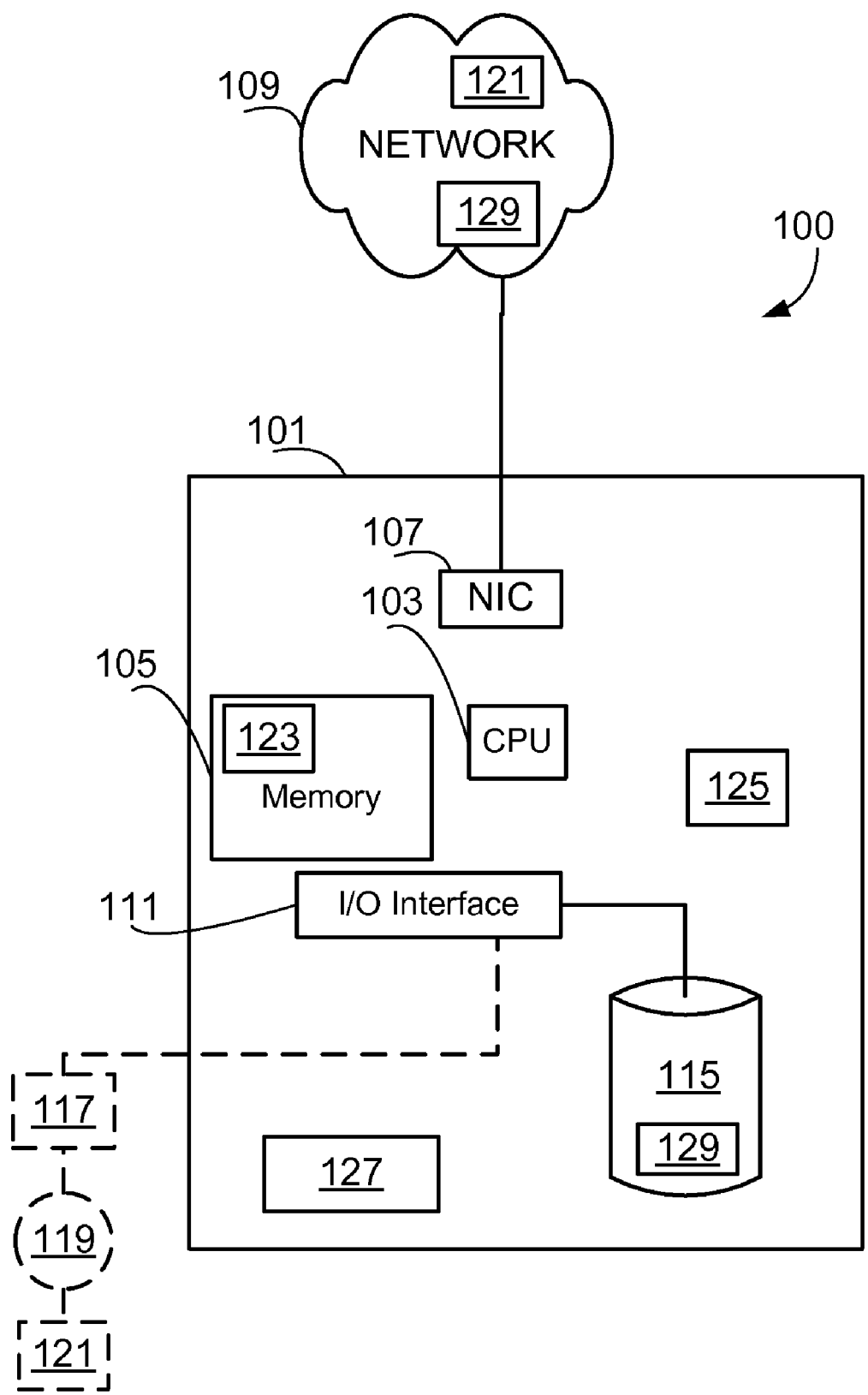
FIG. 1 illustrates a server computer that can be used in a server farm.

The technology disclosed herein teaches a computer-controlled method that connects to at least one monitored-system-diagnostic database that contains monitored-system-signal data. The monitored-system-signal data is gathered from one or more of a set of monitored computers over a period of time. The method identifies operational state signals within the monitored-system-signal data. The operational state signals are relevant to a diagnostic. The method partitions the operational state signals into splits. The method creates a first partial wellness state that is responsive to a first of the splits, by executing a first copy of the diagnostic on a first computer. The method concurrently creates a second partial wellness state, responsive to a second of the splits, by executing a second copy of the diagnostic on a second computer. Next, the method determines a wellness state that is responsive to the first partial wellness state and the second partial wellness state where the wellness state is related to at least one of the set of monitored computers. The method also presents the wellness state. Systems that perform the method and program products that contain computer instructions that, when executed by the computers in the system, cause the system to perform the method, are also disclosed.

One aspect of the technology is a computerized diagnostician-server based framework for a set of monitored computers that examines operational state signals (current, past, or combination thereof) to diagnose which of the monitored computers have failed or are likely to fail. The diagnostician-server periodically accesses at least one monitored-system-diagnostic database containing monitored-system-signal data and can determine a wellness state for each of the monitored computers, components within the monitored computer, or aggregations of monitored computers and their connections. The wellness state can be stored in a database for access by, for example, a cluster scheduler that distributes work to monitored computers. The wellness state can also be obtained directly from the diagnostician-server through the use of a remote communication protocol. The diagnostician-server can be implemented using redundant servers and/or sharded data. Diagnostics run by the diagnostician-server are executed in a parallel manner. The operational state signals represent the condition of tangible devices and/or aggregations of tangible devices. One skilled in the art will understand that sharded data means data that is split into multiple partitions.

The following description is presented to enable any person skilled in the art to make and use the disclosed technology, and is provided in the context of a particular application and its requirements. Various modifications to the disclosed embodiments will be readily apparent to those skilled in the art, and the general principles defined herein may be applied to other embodiments and applications without departing from the spirit and scope of the disclosed technology. Thus, the present claims are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system perform the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

A procedure is a self-consistent sequence of steps that can be performed by logic implemented by a programmed computer, specialized electronics or other circuitry, or a combination thereof that leads to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as (for example, but without limitation) a diagnostic logic, a data identification logic, a partition logic, a parallel processing logic, a presentation logic, a partial wellness state determination logic, a receiver logic, a reply logic, a test determination logic, a wellness state determination logic, etc.

One skilled in the art will understand that many computer servers include multiple computation units or cores. These cores share the computer's memory and devices and generally can be treated as separate computers. The technology disclosed herein is presented in an environment that assumes that the cores of multi-core computers are separately assigned. However, such a one will also understand how to implement the disclosed technology where resources are assigned on a computer-by-computer basis instead of a core-by-core basis.

It has been found that the existing technology used to monitor the operational health of the computers in a server farm does not operate well with the tens of thousands (or more). The technology disclosed herein teaches an efficient and scalable technique for monitoring computers. The technology scales at most linearly (but typically sub-linearly) with the number of monitored computers. In addition, the disclosed technology can use statistical analysis on the data captured from the statistically significant number of monitored computers to perform cost-effective preventive service on a monitored computer that is likely to fail. The disclosed technology enables a diagnostician-server.

The diagnostician-server accesses a database of operational state signals and repair history for components in the server farm. Components in the server farm can include monitored computers, components of monitored computers, monitored computers on a sub-network, monitored computers in a specific rack, physical room, building, or other aggregation of monitored computers and/or aggregations. The database can include information such as the location, model identification and serial number of the monitored computer as well as for its components. The database can also contain externally measured performance data (as some of the operational state signals) obtained from other computers resulting from, for example, interactions between the monitored computers, interactions by a non-monitored computer with any of the monitored computers or operational state signals that generally are not available to the monitored computers. The database can also include human observations about the monitored computers. The database can be populated from collectors that periodically read operational state signals from the monitored computers. In addition, the database can store operational state signals that represent actions performed on the monitored computers (such as repairs, component replacement, maintenance outages, electrical power variations, etc.). Thus, the operational state signals can include the failure/repair history as well as historical and current monitored-system-signal data of the monitored computers.

One example of externally measured performance data is performance information about one of the monitored computers as detected by any other computer that accesses that monitored computer. For example, a file system can detect a monitored computer's response time to file-related requests and can submit corresponding operational state signals to one of the accessed databases. The cluster scheduler can also detect "straggler" computers when the cluster is performing, for example, a parallelization operation. In addition, externally measured performance data can include information about component reinstallations, previous software/OS versions, swapped parts, IP or hostname changes (machines may be moved and renamed, and problems can occur during the move), geographical location, proximity to cooling units, power distribution units for component, routers used by the component, usage of the component, recent applications executed by the component, etc.

The diagnostician-server periodically executes a number of diagnostics on the monitored-system-signal data to determine a wellness state for any of the monitored computers (as well as for components within the monitored computer). In one implementation, for each diagnostic, a parallelization operation is invoked to determine wellness states for the monitored computers with respect to that diagnostic. In preparation for the parallelization operation, the operational state signals relevant for that diagnostic are partitioned into a number of splits. The splits and diagnostic are assigned to assigned-computing-cores (that can be in server computers from within the monitored computers) that concurrently (and in parallel) perform the diagnostic's first parallelization function to generate partial wellness states corresponding to the evaluated split. The diagnostic's second parallelization function is concurrently (and in parallel) performed on the partial wellness states as they are computed (for example, the partial wellness states can be performed by assigned-computing-cores that concurrently execute the diagnostic's second parallelization function). The wellness state for each of the monitored computers with respect to the diagnostic is determined by processing the results of the diagnostic's parallelization operations.

In very large server farms, computers that perform critical functions (such as the cluster scheduler) and the diagnostician-server are often sharded and replicated to provide both scalability and reliability. An example of a server is shown in FIG. 1.

FIG. 1 illustrates a server 100 that can incorporate the technology described herein. The server 100 includes a computer 101 that incorporates a CPU 103, a memory 105, and a network interface 107. The network interface 107 provides the computer 101 with access to a network 109. The computer 101 also includes an I/O interface 111 that can be connected to a storage system 115, and an optional removable data device 117. The optional removable data device 117 can read a computer-usable data carrier 119 (such as a fixed or replaceable ROM within the optional removable data device 117 itself (not shown), as well as a computer-usable data carrier that can be inserted into the optional removable data device 117 itself (such as a memory stick, CD, floppy, DVD or any other tangible media)) that typically contains a program product 121. The storage system 115 (along with the optional removable data device 117), the computer-usable data carrier 119, and, in some cases, the network 109 comprise a file storage mechanism. The program product 121 on the file storage mechanism is generally read into the memory 105 as a program 123 which instructs the CPU 103 to perform specified operations. In addition, the program product 121 can be provided from devices accessed using the network 109. The server 100 generally includes some form of cooling device such as a fan 125 as well as a variety of component sensors (for example, a thermal sensor 127). A database portion 129 can reside on the storage system 115 and/or on the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical medium, can be a computer-usable data carrier. One skilled in the art will understand that not all of the displayed features of the computer 101 need to be present in all embodiments that implement the techniques disclosed herein. Further, one skilled in the art will understand that computers are ubiquitous within modern devices ranging from cell phones to vehicles to kitchen appliances, etc.

Figure 2:
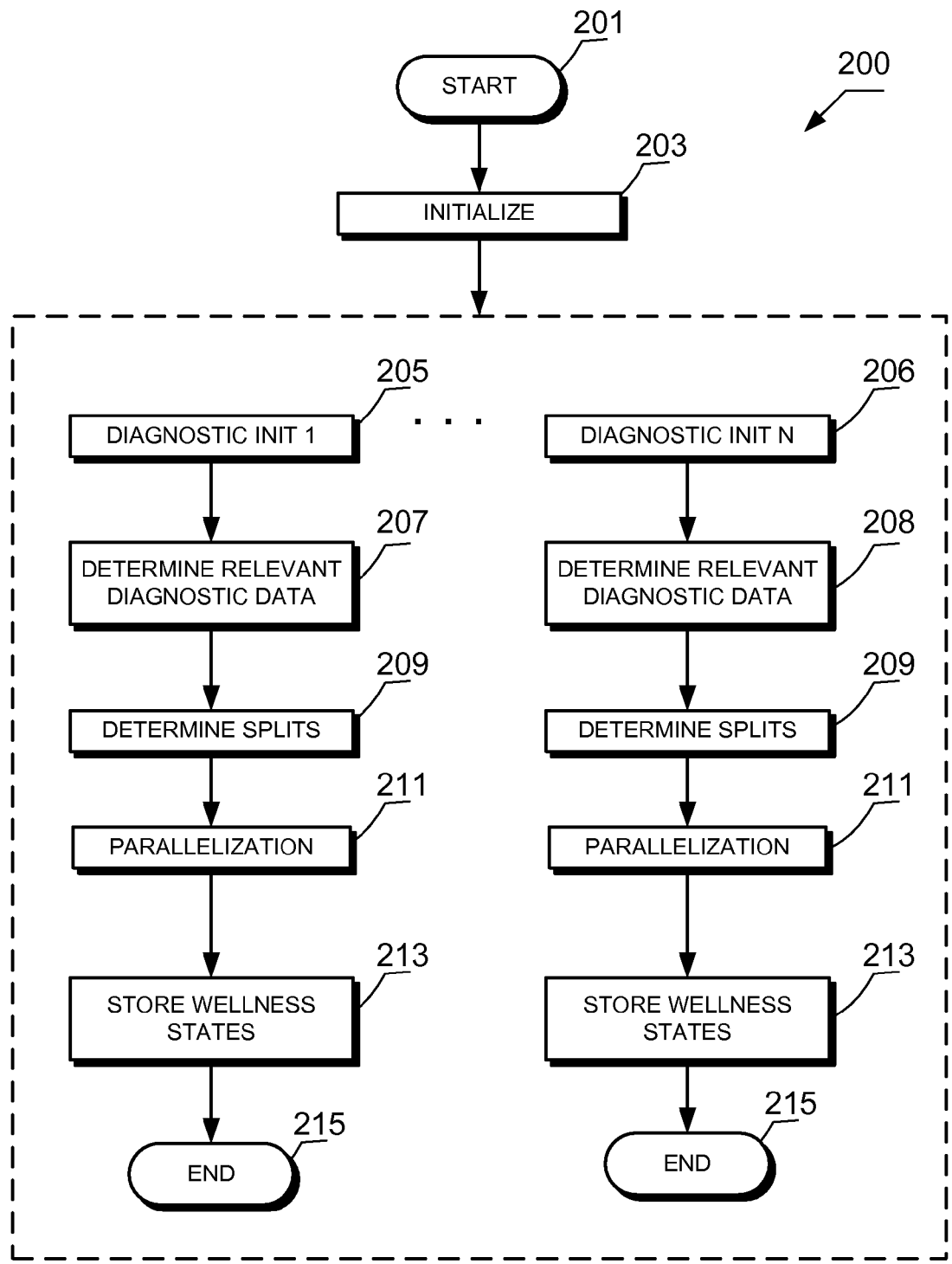
FIG. 2 illustrates a server diagnosis process.

FIG. 2 illustrates a server diagnosis process 200 that can be periodically executed to generate or update wellness states (subsequently discussed) for the set of monitored computers. The server diagnosis process 200 initiates at a start terminal 201 after being invoked by, for example, an operator command, a timer event, a startup script, etc. The server diagnosis process 200 is generally executed by the diagnostician-server (in addition, application programs can link to a diagnostician library as is subsequently described). Once initiated, the server diagnosis process 200 continues to an 'initialization' procedure 203 that performs any initialization needed to select which diagnostics to execute, and whether or not the diagnostic is to be executed in a test mode. The server diagnosis process 200 then starts the selected diagnostics by invoking a 'first diagnostic initialization' procedure 205 and an '$N^{th}$ diagnostic initialization' procedure 206. Each diagnostic can execute within a separate diagnostic framework. The 'first diagnostic initialization' procedure 205 performs initialization for the diagnostic. This initialization can include preparing for parallel execution of the diagnostic (for example, performing a parallelization initialization). A 'diagnostic data selection' procedure 207 determines what data is to be accessed by the diagnostic. A 'diagnostic data selection' procedure 208 performs the same function for diagnostic related to the '$N^{th}$ diagnostic initialization' procedure 206. The data selected by the 'diagnostic data selection' procedure 207 and the 'diagnostic data selection' procedure 208 can be the same or different (such as if the first diagnostic and the $N^{th}$ diagnostic generate different wellness states based on the same data).

A 'determine splits' procedure 209 then evaluates how to partition the data for the diagnostic. In one implementation, the operational state signals are contained in one or more three-dimensional databases (row-column-timestamp). In one implementation, each row represents a monitored computer and a column represents one component of the monitored-system-signal data (for example, a temperature, disk retries, responsiveness, etc.) over time. database rows are distributed during parallelization as the splits. In this implementation, a computer having an internal disk that holds a split is preferably assigned to execute the diagnostic on that split using an assigned-computing-core. Furthermore, if needed, the split can be sent across a network to a computer that contains the assigned-computing-core.

A ' parallel process diagnostic data' procedure 211 executes (in parallel) the first and second parallelization functions using the assigned-computing-cores (which can be dynamically reassigned if appropriate). The diagnostic's first parallelization function filters out most of the noise in the splits, and its second parallelization function cleanly summarizes each machine's information. Once the assigned-computing-core has completed executing the diagnostic's first parallelization function on the split, it returns a partial wellness state for a monitored computer for that diagnostic/split relationship. The partial wellness state is then available for the diagnostic's second parallelization function as well as the diagnostic's wellness state determination function (subsequently described with respect to FIG. 4). The diagnostics can complete through an end terminal 215 for each respective diagnostic.

Like the diagnostic's first parallelization function, the diagnostic's second parallelization function can be performed in parallel to process the partial wellness states resulting from the splits, and the results of the second parallelization function can generate wellness states for aggregations of monitored computers or other server farm components (for example, the wellness state for a rack of servers, for a cluster of servers, etc.). The diagnostic's wellness determination function can calculate the wellness state of server farm components for that diagnostic (from the wellness state of an installation to the wellness state of a particular component of a monitored computer). The partial wellness states from the diagnostics can be accumulated in the database row for a given server farm component (for example, a monitored computer) to determine the wellness state of that monitored computer. The partial wellness states for a component of a monitored computer can be treated as the wellness state for that component. A 'store wellness states' procedure 213 stores the wellness states for presentation (presentation is subsequently described with respect to FIG. 3).

The wellness state can include health status about a component in the server farm, the monitored computer, each component in the monitored computer, a probability of pending failure (failure probability) of the monitored computer or of the computer component, etc. The wellness state for a particular server farm component (for example, a monitored computer) can be determined from executing a diagnostic that processes the wellness state of each of that component's sub-components. For example, the wellness state of a monitored computer can be determined by executing a diagnostic that processes the wellness state of each of that monitored computer's components (as well as, for example, current and historical operational state signals and/or repair history related to that monitored computer or to components of that monitored computer).

If, for example, all the monitored computer's components have a wellness state of "healthy", then the wellness state for that monitored computer is likely to be "healthy" (possibly subject to contrary externally measured performance data). If some of the components have a wellness state of "failed" or "predicted-to-fail", the wellness state of the computer can be adjusted accordingly. In general, a change in a given component's wellness state can be propagated to aggregations of components that contain that given component. One skilled in the art will understand that if, for example, one disk of a correcting RAID set has failed, the RAID unit can continue to operate. However, the server should have the failing disk replaced. Furthermore, if a fan speed is too slow, a temperature is too high, or a disk access consistently results in multiple attempts, these wellness states can allow for continued use of the server until the problem is fixed or the monitored computer (or component) fails.

The wellness state for the monitored computers or other components can be presented by the diagnostician-server for use by other computers (for example, a cluster scheduler or by the Google File System), and/or by those that repair the monitored computers.

One skilled in the art will understand that the specific details described with respect to FIG. 2 are directed to one implementation. Such a one will understand that any efficient and scalable batch data processing system can provide functionality equivalent to the functionality needed for parallelization and any scalable data repository with support for time series can provide functionality equivalent to the functionality provided by the three-dimensional databases.

Figure 3:
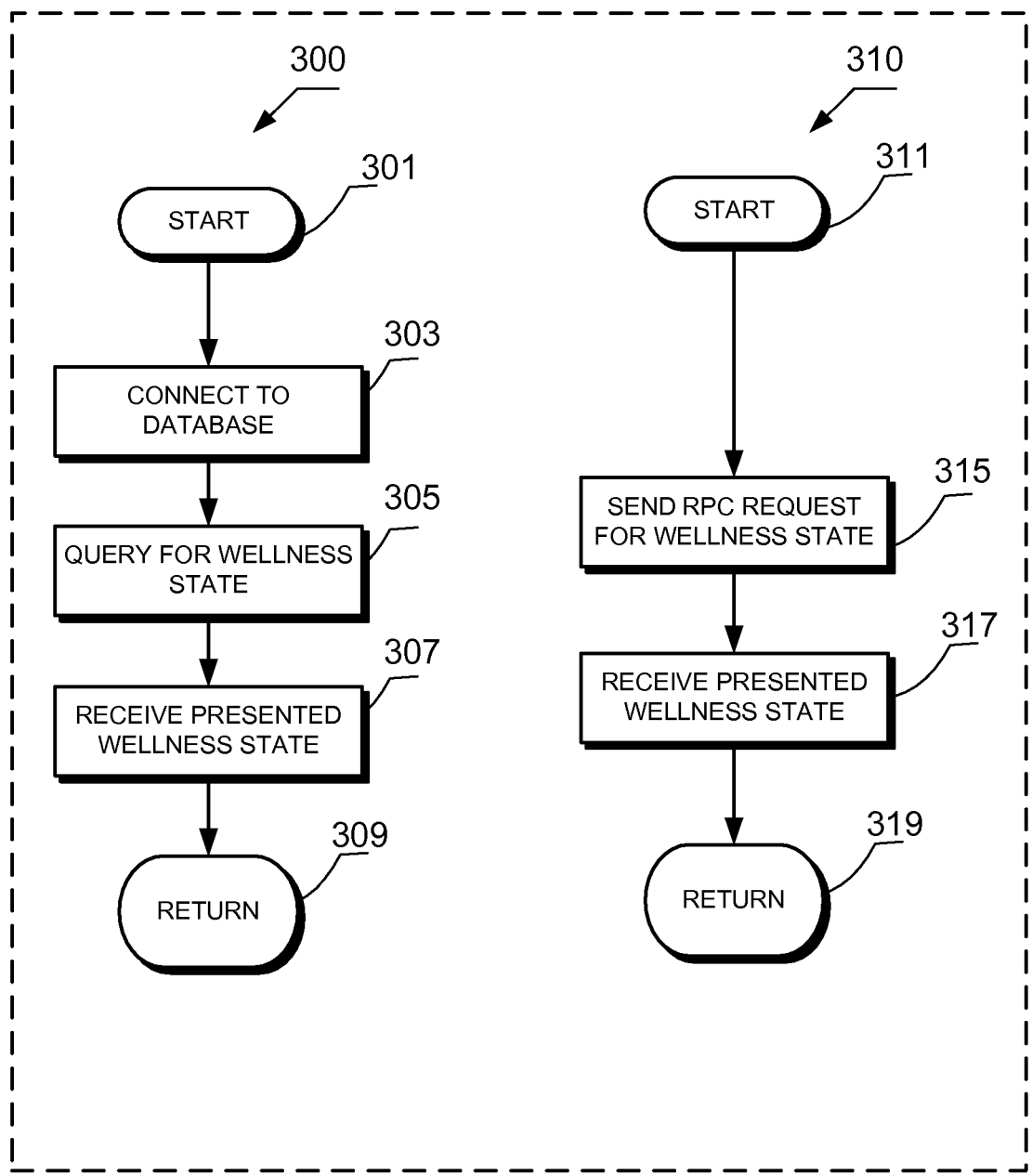
FIG. 3 illustrates examples of wellness state presentation processes.

FIG. 3 illustrates a database-oriented wellness state presentation process 300. To obtain the wellness state of a monitored computer, a process can access a database containing the wellness states generated by the diagnostician-server. The database-oriented wellness state presentation process 300 can be invoked by an application, initiates at a start terminal 301, and continues to a 'connect to state database' procedure 303 that establishes a connection to the wellness states database for the monitored computers. Once a connection is established, a 'query for wellness state' procedure 305 queries the database for the requested wellness state for one or more of the monitored computers or other components in the server farm. A 'receive presented wellness state' procedure 307 receives the requested wellness state(s) that are then presented to the invoking application through a return terminal 309. The presented wellness state(s) can be used by other computers, or displayed to a human (for example, by storage, display on a terminal, by generating a print out, etc.).

FIG. 3 also illustrates a diagnostician-server-oriented wellness state presentation process 310. To obtain the wellness state of a monitored computer directly from the diagnostician-server, a process can invoke the diagnostician-server-oriented wellness state presentation process 310 that initiates at a start terminal 311. A 'send RPC request' procedure 315 sends a RPC message to the diagnostician-server who receives it and responds with a corresponding RPC message (or set of messages) that can be received by the 'receive presented wellness state' procedure 317. The received RPC message(s) contains the presented wellness states for one or more of the monitored computers, computer components, server farm components, etc. The presented wellness states are returned to the invoking application through a return terminal 319. The presented wellness state(s) can be used by other computers, or displayed to a human (for example, by storage, display on a terminal, by generating a print out, etc.).

One skilled in the art will understand that the database-oriented wellness state presentation process 300 and the diagnostician-server-oriented wellness state presentation process 310 have been described without respect to any error-handling. Such a one would understand how to implement such error-handling without undue experimentation.

One common use for the database-oriented wellness state presentation process 300 and/or the diagnostician-server-oriented wellness state presentation process 310 is to determine whether a monitored computer is sufficiently healthy to participate in a task being managed by a cluster scheduler or other server farm process. The cluster scheduler can obtain wellness states for the monitored computers using, for example, the processes previously described with respect to FIG. 3. Another common use is to drill-down to determine which of the components in the monitored computer have contributed to a non-healthy wellness state for the monitored computer (for example, whether a component known to be part of the monitored computer is no longer detected, whether a CPU fan is no longer controllable, whether a hard disk is performing poorly, whether a memory module is not operational or has excessive correctable errors, etc.). For maintenance purposes, an application can obtain the wellness state of monitored computers or groups of server farm components that have a wellness state other than "healthy" and can drill-down to acquire the wellness state of the components that are not "healthy" to recommend service or replacement of the component. In addition, predicted failure notifications can be submitted to the repair organization to insure that a replacement part is available and to enable pre-emptive repair/replacement of a predicted soon-to-fail component. Each of these usages is an example of presenting the wellness state.

Figure 4:
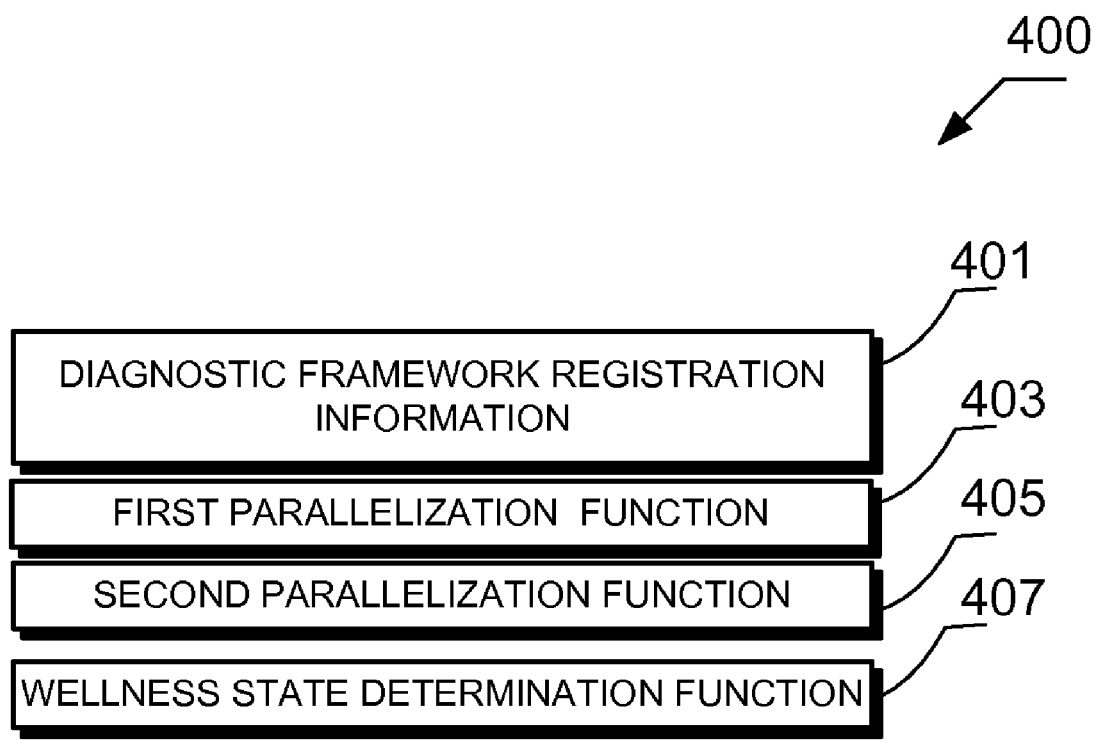
FIG. 4 illustrates the structure of a diagnostic definition.

The diagnostics can be created by domain experts and/or by machine-learning algorithms. FIG. 4 illustrates components of a diagnostic definition 400 used in one implementation of the disclosed technology. The diagnostic definition 400 includes an identification portion 401. The identification portion 401 includes registration information used to identify the diagnostic to the execution framework. This registration information can include an identification of which problem is being diagnosed, the version number of the diagnostic, the window size needed for historical data, whether or not the diagnostic is to be executed in a test mode, and what data is needed by the diagnostic. The diagnostic definition 400 also can include a first parallelization function 403 and a second parallelization function 405 that can be used by the diagnostic framework during the parallelization operation. A wellness state determination function 407 processes the partial wellness states returned by the first parallelization function (and optionally the second parallelization function) to determine the wellness state for the affected servers in the set of monitored computers. The second parallelization function can be used to generate a wellness state for combinations of monitored computers (such as those in a given rack, cluster, manufacturer, model, etc.). Diagnostics executed in test mode can generate wellness states that can be presented. However, such wellness states are generally not used by cluster schedulers and instead are generally used during modeling of the set of monitored computers or while developing the related diagnostic.

The diagnostic tests can be conceptualized, for example, as "has this variable exceeded this threshold more than X times in the last Y days." More advanced diagnostics can be conceptualized, for example, as "has this variable averaged more than X and this machine type is Y, the machine has hard drives of model ZZZZ and has not been to repairs in the last W days." Multiple conceptualizations can be combined to form the diagnostic. The diagnostic framework used in the diagnostician-server can include library functions such as mathematical functions, statistical functions, cataloging functions, etc. In one embodiment, the diagnostic is written in C++ code and executes within a framework that allows the domain expert to focus on the diagnostic code instead of parallelization details.

Periodically, the diagnostician-server executes the diagnostics on the monitored-system-signal data. The 'initialization' procedure 203 registers the diagnostics using information the domain experts have provided in the identification portion 401 for each diagnostic definition 400. The 'diagnostic data selection' procedure 207 and the 'determine splits' procedure 209 for a given diagnostic uses information in the identification portion 401 to setup the splits. The first parallelization function 403 and the second parallelization function 405 for a given diagnostic are used by the framework when performing the parallelization operation. At completion of the parallelization operation, the framework executes the wellness state determination function 407 on the parallelization results to determine the wellness state for the monitored computer.

Once the diagnostic has been executed, the corresponding wellness state is available (as previously described with respect to FIG. 2 and FIG. 3). Subsequent executions of the diagnostic by the diagnostician-server will update the wellness state. The server diagnosis process 200 can be periodically executed to keep the wellness state sufficiently fresh for the needs of the server farm.

The diagnostician-server can be executed by a high reliability server and can also be executed by an application linked to a diagnostician library. This allows the application to obtain fresh wellness states for a limited number of components (because the diagnostician-server is periodically executed, the wellness states can become stale for some server farm processes). The diagnostician library enables the application to invoke diagnostics for a smaller set of server farm components (for example, monitored computers) to obtain fresh wellness states for those components. The diagnostician library can also access wellness states from the diagnostician-server.

Google Inc. has a statistically significant number of computers and computer components such that past sensor and repair history data can be used to predict failures based on historical and current data. For example, the historical data used to diagnose a particular component need not be related to just that component, but can also include data from all similar components in the set of monitored computers. Thus, if computer A has a disk model D, the failure history of all disks of model D can be used by the diagnostic to determine a failure probability that can be incorporated into the wellness state of computer A. Thus, transitory aberrations related to, for example, a particular model of disk, may not be correlated to failures of that model of disk within some future time frame, while the same transitory aberrations based on another model of disk can be correlated to failures of that model of disk within some time frame. In addition, a diagnostic being developed can be applied against the historical data prior to enabling the rule in production (by specifying the appropriate state for test mode (see the prior description with respect to the identification portion 401) to back-test new hypotheses. A validation infrastructure allows execution of both the existing diagnostics and those under development such that the developers can determine the differences between the production diagnostics and those being developed.

The diagnostician-server approach to providing diagnosis for and status of monitored components in a server farm is extremely scalable, unifies performance data formats (even when fresh wellness state is needed), and reduces the need for other status determination programs. In addition, the diagnostician-server can process massive amounts of historical and current operational state signals (including historical and current externally measured performance data).

One skilled in the art will understand that the technology disclosed herein enables a scalable, reliable diagnostic system for a very large number of monitored computers.

From the foregoing, it will be appreciated that the technology has (without limitation) the following advantages:

1) The technology is scalable and can be used to diagnose and provide wellness states from individual components of a single monitored computer to assemblies of clusters of computers.

2) The technology allows wellness states of the monitored computer to be accessed through a database maintained by a diagnostician-server.

3) The technology allows wellness states of the monitored computer to be accessed through a remote procedure call to a diagnostician-server.

4) The technology allows the functionality of the diagnostician-server to be executed by a diagnostician-server, an application linked to a diagnostician library or some combination thereof.

5) The technology provides a standardized reference for determining wellness state for components in a server farm.

6) The technology standardizes, within a server farm, the format of wellness state information, and the programming code used to determine the wellness state of a component within a server farm.

7) The technology simplifies development of diagnostics because the impact of diagnostics under development can be compared to the wellness states generated by the production diagnostician-server.

8) The diagnostician-server technology is independent from the technology used to gather operational state signals from the monitored computers.

9) The diagnostics can use any information from the set of monitored computers to determine the wellness state of a given component. For example, if the history data for the set of monitored computers shows that a component within a serial number range is more likely to fail than a component outside that range, the wellness state for such components and aggregations of such components can reflect that history.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer-controlled method comprising:
   connecting to at least one monitored-system-diagnostic database containing monitored-system-signal data, said monitored-system-signal data gathered from one or more of a set of monitored computers over a period of time;
   identifying operational state signals within said monitored-system-signal data, said operational state signals relevant to a diagnostic;
   partitioning said operational state signals into a plurality of splits;
   creating a first partial wellness state, responsive to a first of said plurality of splits, using a first copy of said diagnostic executed by a first computer;
   concurrently creating a second partial wellness state, responsive to a second of said plurality of splits, using a second copy of said diagnostic executed by a second computer;
   determining a wellness state responsive to said first partial wellness state and said second partial wellness state, said wellness state related to at least one of said set of monitored computers; and
   presenting said wellness state.

2. The computer-controlled method of claim 1, wherein said diagnostic is one of a plurality of diagnostics, two or more of said plurality of diagnostics executed in parallel.

3. The computer-controlled method of claim 1, wherein said at least one monitored-system-diagnostic database includes externally measured performance data gathered about one or more of said set of monitored computers.

4. The computer-controlled method of claim 1, wherein presenting said wellness state further comprises:
   receiving a request for said wellness state;
   determining whether said diagnostic was executed in a test mode; and
   returning said wellness state responsive to determining.

5. The computer-controlled method of claim 1, wherein presenting said wellness state further comprises receiving a request for said wellness state and returning said wellness state.

6. The computer-controlled method of claim 1, wherein said operational state signals further comprises historical operational state signals and said diagnostic determines a failure probability responsive to said historical operational state signals.

7. A computer-controlled system comprising:
   at least one monitored-system-diagnostic database containing monitored-system-signal data gathered from one or more of a set of monitored computers over a period of time;
   a diagnostic logic including a partial wellness state determination logic and a wellness state determination logic;
   a data identification logic, responsive to the diagnostic logic, configured to identify operational state signals relevant to the diagnostic logic, within said monitored-system-signal data;
   a partition logic configured to partition said operational state signals identified by the data identification logic into a plurality of splits;
   a parallel processing logic, responsive to the partition logic, configured to apply, in parallel, said partial wellness state determination logic to a first of said plurality of splits at a first computer and a second of said plurality of splits at a second computer to determine a first partial wellness state and a second partial wellness state respectively;
   a wellness state determination logic configured to determine a wellness state responsive to said first partial wellness state and said second partial wellness state, said wellness state related to at least one of said set of monitored computers; and
   a presentation logic, responsive to the wellness state determination logic, configured to present said wellness state.

8. The computer-controlled system of claim 7, wherein the diagnostic logic is one of a plurality of diagnostic logics, and two or more of said plurality of diagnostic logics operating in parallel.

9. The computer-controlled system of claim 7, wherein said at least one monitored-system-diagnostic database includes externally measured performance data gathered about one or more of said set of monitored computers.

10. The computer-controlled system of claim 7, wherein the presentation logic further comprises:
    a receiver logic configured to receive a request for said wellness state;
    a test determination logic, responsive to the receiver logic, configured to determine whether the diagnostic logic was executed in a test mode; and
    a reply logic, responsive to the test determination logic, configured to return said wellness state.

11. The computer-controlled system of claim 7, wherein the presentation logic further comprises a receiver logic configured to receive a request for said wellness state and a reply logic configured to return said wellness state.

12. The computer-controlled system of claim 7, wherein said operational state signals comprises historical operational state signals and the diagnostic logic determines a failure probability responsive to said historical operational state signals.

13. A computer-program product comprising:
    a computer-usable data carrier providing instructions that, when executed by a computer, cause said computer to perform a method comprising:
    connecting to at least one monitored-system-diagnostic database containing monitored-system-signal data, said monitored-system-signal data gathered from one or more of a set of monitored computers over a period of time;

identifying operational state signals within said monitored-system-signal data, said operational state signals relevant to a diagnostic;

partitioning said operational state signals into a plurality of splits;

creating a first partial wellness state, responsive to a first of said plurality of splits, using a first copy of said diagnostic executed by a first computer;

concurrently creating a second partial wellness state, responsive to a second of said plurality of splits, using a second copy of said diagnostic executed by a second computer;

determining a wellness state responsive to said first partial wellness state and said second partial wellness state, said wellness state related to at least one of said set of monitored computers; and presenting said wellness state.

14. The computer-program product of claim 13, wherein said diagnostic is one of a plurality of diagnostics, two or more of said plurality of diagnostics executed in parallel.

15. The computer-program product of claim 13, wherein said at least one monitored-system-diagnostic database includes externally measured performance data gathered about one or more of said set of monitored computers.

16. The computer-program product of claim 13, wherein presenting said wellness state further comprises:

receiving a request for said wellness state;

determining whether said diagnostic was executed in a test mode; and returning said wellness state responsive to determining.

17. The computer-program product of claim 13, wherein presenting said wellness state further comprises receiving a request for said wellness state and returning said wellness state.

18. The computer-program product of claim 13, wherein said operational state signals further comprises historical operational state signals and said diagnostic determines a failure probability responsive to said historical operational state signals.

\* \* \* \* \*